(12) United States Patent
Yuan et al.

(10) Patent No.: US 9,776,523 B2
(45) Date of Patent: Oct. 3, 2017

(54) METHOD AND APPARATUS FOR CONTROLLING CHARGING PROCESS

(71) Applicants: Wei Yuan, Beijing (CN); Zhenling Wu, Beijing (CN); Jinliang Hou, Beijing (CN); Po Yuan, San Jose, CA (US)

(72) Inventors: Wei Yuan, Beijing (CN); Zhenling Wu, Beijing (CN); Jinliang Hou, Beijing (CN); Po Yuan, San Jose, CA (US)

(73) Assignees: Wei Yuan, Beijing (CN); Zhenling Wu, Beijing (CN); Jinliang Hou, Beijing (CN); Po Yuan, San Jose, CA (US)

(*) Notice: Subject to any disclaimer, the term of this patent is extended or adjusted under 35 U.S.C. 154(b) by 177 days.

(21) Appl. No.: 14/548,244

(22) Filed: Nov. 19, 2014

(65) Prior Publication Data

US 2015/0162762 A1    Jun. 11, 2015

Related U.S. Application Data

(60) Provisional application No. 61/963,429, filed on Dec. 5, 2013.

(51) Int. Cl.
*H02J 7/00* (2006.01)
*B60L 11/18* (2006.01)

(52) U.S. Cl.
CPC .......... *B60L 11/1824* (2013.01); *H02J 7/008* (2013.01); *H02J 7/0031* (2013.01); *H02J 7/0047* (2013.01); *H02J 2007/005* (2013.01); *H02J 2007/0037* (2013.01)

(58) Field of Classification Search
CPC ........ H02J 7/0031; H02J 7/0047; H02J 7/008; H02J 2007/005; H02J 2007/0037; B60L 11/1824
USPC ................................ 320/107, 109, 137, 162
See application file for complete search history.

(56) References Cited

U.S. PATENT DOCUMENTS

| | | |
|---|---|---|
| 2010/0109931 A1 | 5/2010 | Esnard et al. |
| 2011/0169454 A1 | 7/2011 | Maruyama |
| 2011/0260680 A1 | 10/2011 | Veselic et al. |
| 2011/0267000 A1 | 11/2011 | Horie |
| 2011/0267006 A1 | 11/2011 | Tanno |
| 2012/0032643 A1 | 2/2012 | Yun et al. |
| 2012/0200968 A1 | 8/2012 | Altemose |
| 2012/0249087 A1 | 10/2012 | Kimura |
| 2013/0175983 A1* | 7/2013 | Partovi ................... H01F 5/003 320/108 |
| 2013/0249446 A1* | 9/2013 | Kumagai ............ B60L 11/1859 318/139 |

* cited by examiner

*Primary Examiner* — Edward Tso
*Assistant Examiner* — Aaron Piggush
(74) *Attorney, Agent, or Firm* — Guosheng Wang; United States Research and Patent Firm

(57) ABSTRACT

An apparatus for controlling a charging process is provided. The apparatus comprises a first interface, a second interface, and a switch connected therebetween. The first interface may be electrically connectable to a charger to receive power, and the second interface may be electrically connectable to a device. The switch may receive a signal transmitted from the device and, in response to the signal, turn on/off the power provided from the first interface to the second interface. The apparatus is compatible with existing chargers.

5 Claims, 4 Drawing Sheets

METHOD AND APPARATUS FOR CONTROLLING CHARGING PROCESS

CROSS-REFERENCE TO RELATED U.S. APPLICATIONS

This application claims the benefit of U.S. Provisional Patent Application No. 61/963,429, filed Dec. 5, 2013, which is incorporated herein by reference in its entirety.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to methods and apparatuses for controlling the charging process of a device including a rechargeable battery, and more particularly, to methods and apparatuses that are capable of providing a safe and convenient charging process for a device including a rechargeable battery.

BACKGROUND OF THE INVENTION

Rechargeable batteries are widely used in various electric devices, ranging from small devices such as cellular phones, tablet computers, portable media players, personal digital assistants (PDAs) or the like, to large devices such as electrical vehicles. For such electric, devices that are powered by rechargeable batteries, battery charger becomes an essential accessory.

Earlier generations of the rechargeable batteries are Nickel Cadmium batteries or Nickel Metal Hydride batteries. These types of batteries have already been replaced by Lithium batteries in the market today. Typical Lithium battery charging control is achieved by two functional circuits: a charging circuit and an overcharge protection circuit, which are implemented in the device such as a cellular phone. The charging circuit typically can detect a connection between the charger and the mobile device, and control the charging current to the battery. The charging circuit may also have a measuring circuit to gauge the battery level of the battery under charging. The overcharge protection circuit can regulate an instable voltage to protect the battery, and it can also disable the charging circuit to prevent the battery from being overcharged when the battery level reaches a predetermined level.

Until today, however, there is no existing charger that is designed to provide a convenient and safe charging process. Taking cellular phone as an example, people usually charge their cellular phones in the night before they go to bed and unplug the charger in the morning when they get up. At that time in the morning, the cellular phones may have been charged for a long time. For a legacy cellular phone that has no overcharge protection circuit, the battery may be overcharged. Even for a cellular phone that has an overcharge protection circuit built therein, although the overcharge protection circuit can disable the charging circuit to prevent the battery from being overcharged, the charger is always providing power to the charging interface of the cellular phone until it is unplugged. In other words, the charging circuit is always subject to a voltage, which may deteriorate the characteristics of the charging circuit and even shorten the life of the battery.

Accordingly, there is a need for methods and apparatus that are capable of avoiding overcharge of the rechargeable battery and preventing the deterioration of the performance of the charging circuit. Advantageously, the present invention can meet such need.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

An aspect of the present invention is to provide methods and apparatuses that are capable of providing a safe and convenient charging process for a device including a rechargeable battery.

In one embodiment of the present invention, a charging control circuit is provided. The charging control circuit may be connected between a charger and a device to be charged. The charging control circuit may receive signals from the device to turn on/off power provided from the charger to the device. Thus, the charging control circuit can ensure that the charging power may be completely cut off when necessary. While the charging control circuit may be integrated into a conventional charger, it may also be implemented as a separate device compatible with the conventional chargers. In such a case, the charging control circuit may include a first interface, a second interface, and a switch connected therebetween. The first interface may be electrically connectable to a charger to receive power, and the second interface may be electrically connectable to a device. The switch may receive a signal transmitted from the device and, in response to the signal, turn on/off the power provided from the first interface to the second interface.

Another embodiment of the invention provides a device including a rechargeable battery, a monitor, a controller and a communication module. The monitor can monitor the charging status of the rechargeable battery, such as battery level and whether the battery is being charged. The controller may generate, based on the charging status of the rechargeable battery, a signal including a command to turn on/off power provided by a charger to the device. Then, the communication module may transmit the signal to a charging control device.

Yet another embodiment provides a method for charging a device including a rechargeable battery. The method may comprise steps of: connecting the device to a charger via a charging control module; monitoring, at the device, a charging status of the rechargeable battery; generating, at the device, a signal including a command to turn on/off power provided from the charger to the device, in response to the monitored charging status; and turning, by the charging control module, on/off the power provided from the charger to the device in response to the command.

Still another embodiment of the invention provides a computer program product. The computer program product includes instructions embodied therein, which, when executed, cause a process to perform the steps of: checking battery level of a rechargeable battery; checking whether the rechargeable battery is being charged; generating a signal to turn on/off power provided to the rechargeable battery according to the battery level and whether the rechargeable battery is being charged; and transmitting the signal to a charging control device.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form such as block diagrams in order to avoid unnecessarily obscuring the present invention. Other parts may be omitted or merely suggested.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Unless otherwise defined, all terms (including technical and scientific terms) used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Below, respective embodiments will be described in details by reference to the accompanying drawings. Incidentally, in all the drawings for describing the embodiments, the elements having the same function are given the same reference signs and numerals, and a repeated description thereon is omitted. Further, in the following embodiments, a description on the same or similar portions will not be repeated unless otherwise required.

Figure 1:
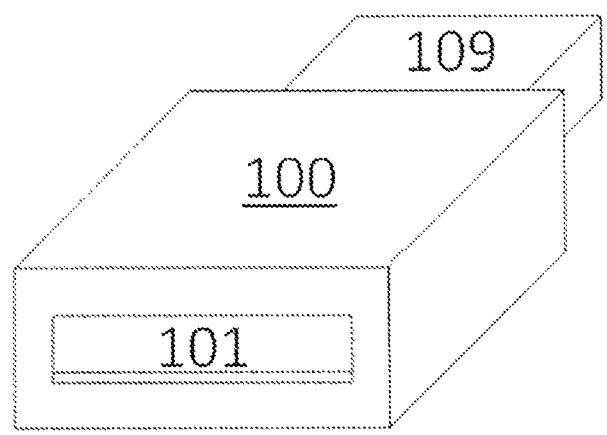
FIG. 1 is a schematic diagram showing a charging control device in accordance with an exemplary embodiment of the present invention.
Figure 2:
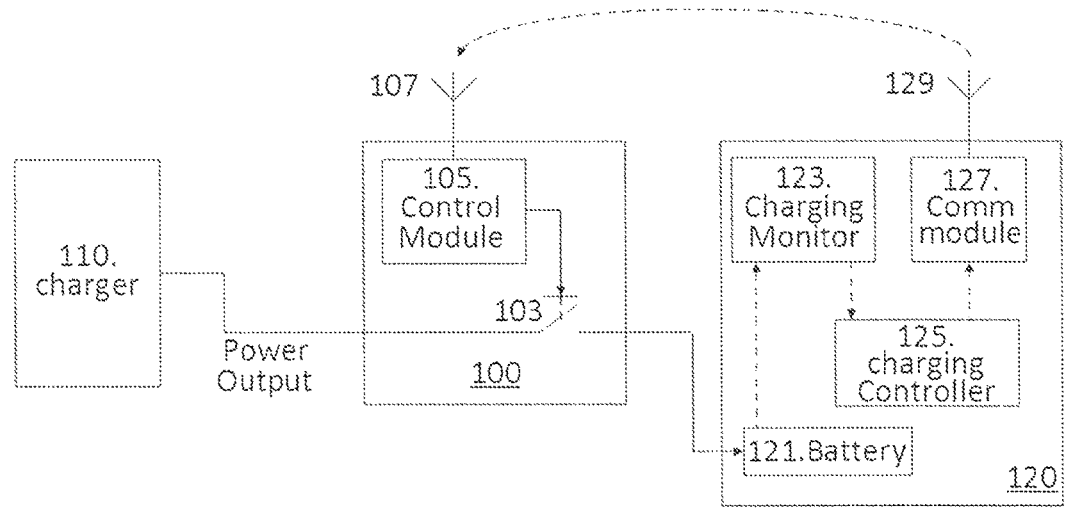
FIG. 2 is a block diagram showing a charging system in which an embodiment of the present invention may be implemented.

Referring to FIG. 1, charging control device 100 has a first interface 101, such as a jack, and a second interface 109, such as a plug. The jack 101 may allow a charger cable to be plugged into and thus receive power provided by the charger, for example, the charger 110 as shown in FIG. 2. It would be understood that the charger 110 may be any known charger. The plug 109 may be plugged into a device, for example, the device 120 shown in FIG. 2, to charge the device by the power received from the charger 110. Although FIG. 1 shows a rectangular outline of the charging control device 100, it may also have any other physical shape.

Now turning to FIG. 2, the charging control device 100 may be connected between the charger 110 and the device 120 by using its first interface 101 and second interface 109 as shown in FIG. 1. Again, the charger 110 may be any existing charger, so a description in detail of its structure will be omitted here. The charging control device 100 further includes a switch 103 connected in series in the path for transmitting the power from the charger 110 to the device 120. Thus, the switch 103 can switch on/off the power to the device 120. The switch 103 may be under the control of a control module 105. The control module 105 may receive a signal transmitted from the device 120 including a command to turn on/off the power provided from the charger 110 to the device 120, and in response to the signal, generate a controlling instruction to tarn on/off the switch 103. In a preferable embodiment as shown in FIG. 2, the signal may be communicated wirelessly from the device 120 to the charging control device 100. In such a case, the charging control device 100 may include an antenna 107 to receive the wirelessly communicated signal. In an example, the signal may be transmitted via a Bluetooth channel. As an option, the charging control device 100 can acquire necessary power from the charger 110. The amount of power necessary for operation of the charging control device 100 is so small that it would not adversely affect the charging of the device 120.

The device 120 may be any device that contains a rechargeable battery 121. For example, the device 120 may be portable electronic devices such as a cellular phone, a pad, a tablet, a media player, a personal digital assistant (RDA), and the like. The device 120 may also be an electric vehicle that powered by a plurality of rechargeable batteries 121 mounted therein. The device 120 may further include a charging monitor 123, a charging controller 125 and a communication module 127.

The charging monitor 123 may monitor the charging status of the device 120, i.e., the charging status of the rechargeable battery 121, and generate information about the monitored charging status. The information may be provided to, and processed in, the charging controller 125, where the signal including the command to turn on/off the power provided from the charger 110 to the device 120 may be generated based on the information about the charging status of the rechargeable battery 121. Then, the signal may be transmitted through the communication module 127 to the charging control device 100. As previously discussed, the signal may be transmitted wirelessly. In such a case, the communication module 127 may further include an antenna 129 to transmit the signal wirelessly to the charging control device 100.

Hereinafter, the charging monitor 123 and the charging controller 125 will be discussed in more details in terms of their operations for a better understanding of the principle of the present invention. The charging, monitor 123 may check the charging status of the rechargeable battery 121, such as a battery level of the rechargeable battery 121 and whether the rechargeable battery 121 is being charged. If the battery level is greater than or equal to a maximum threshold and the rechargeable battery 121 is being charged, the charging controller 125 may generate a signal including a command to turn off the power provided from the charger 110 to the device 120. Thus, the rechargeable battery 121 may be prevented from being overcharged. On the other hand, if the battery level is lower than the maximum threshold and the rechargeable battery 121 is not being charged, the charging controller 125 may generate a signal including a command to turn on the power provided from the charger 110 to the device 120. Thus, the rechargeable battery 121 may be prevented from being undercharged.

Continue to refer to FIG. 2, as previously discussed, the control module 105 included in the charging control device 100 may generate, in response to the signal from the device 120, a controlling instruction to turn on/off the switch 103. Since the switch 103 is connected between the charger 110 and the device 120, the charging power provided from the charger 110 may be completely turned off. Thus, there is no voltage applied to the device 120, thereby preventing deterioration of the performance of the charging circuit included in the device 120.

It should be understood that the charging monitor 123 and the charging controller 125 may be implemented by software, hardware or firmware. In a preferable embodiment, the charging monitor 123 and the charging controller 125 may be implemented as an app, and the app may be downloaded through internet and then installed in the device 120. In particular, when the device 120 is an electrical vehicle, the app may be downloaded by a Car2X communication subsystem, or the app may be acquired through a removable medium such as a SD card or a USB disk. The app may be executed by a processor to implement the process as discussed above. Thus, the charging control device 100 as set forth herein is compatible with existing chargers and electric devices such as smart phones, and it is very easy for customers to implement the embodiments as described herein.

In some other embodiments, the signal for controlling the switch 103 may be communicated by a wire connected between the charging control device 100 and the device 120, instead of using wireless transmission between the antenna 107 and the antenna 129. As an option, the wire may be integrated within the cable for providing power to the device 120, and the interface of the device 120 for receiving the power may be adapted accordingly.

With the charging control device 100, the device 120 does not need any overcharge protection circuit built therein anymore. For example, the device 120 may just need to install an app therein. The charging control device 100 may be used with a plurality of devices 120 such as a cellular phone, a pad, a tablet, a computer, and the like. As a benefit of the present invention, the overall cost of the charging system is reduced. In addition, when the charging control device 100 turns off charging of the device 120, no power is delivered to the device 120, making device 120 in a definitely safe condition.

Figure 4:
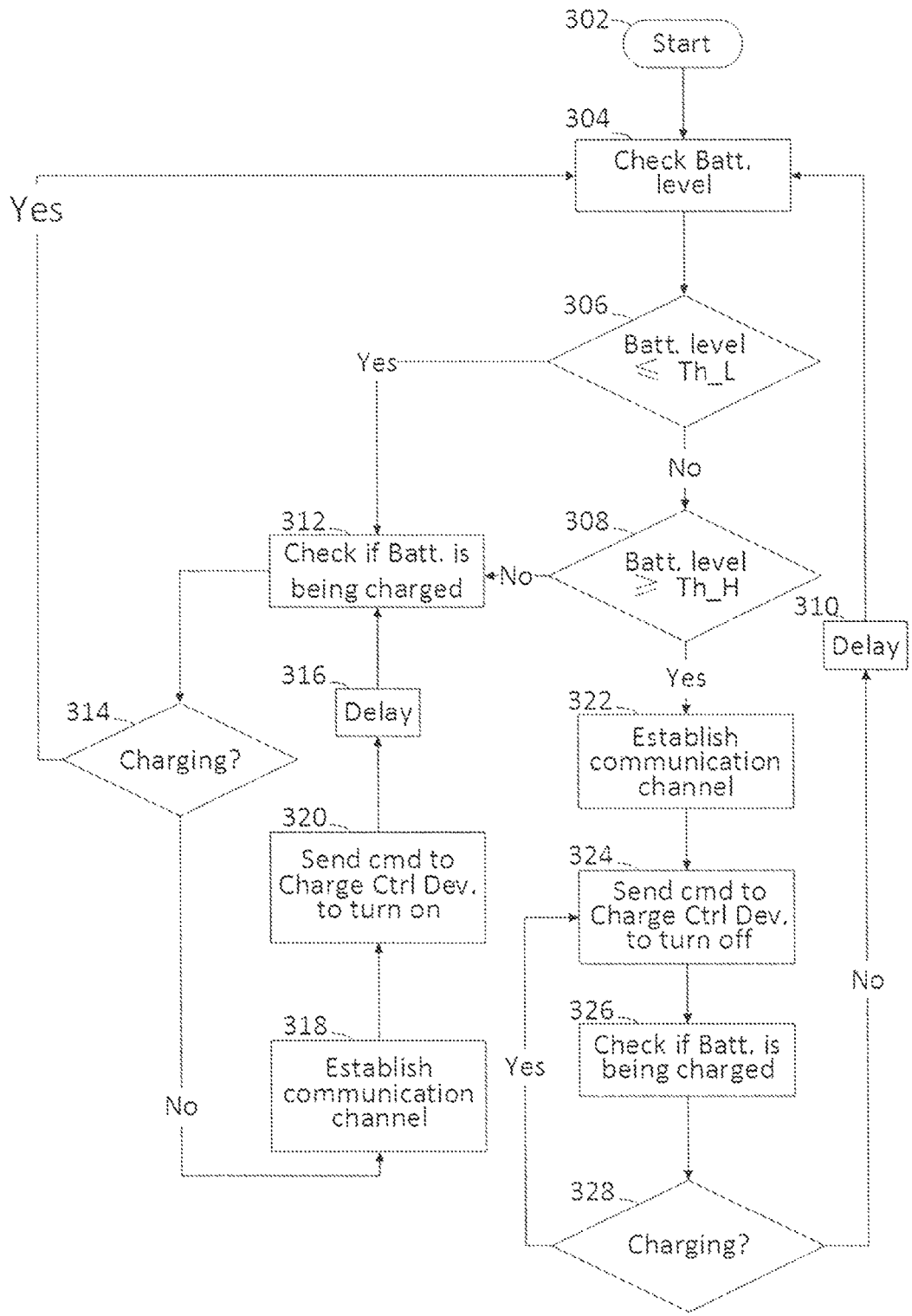
FIG. 4 is a flow diagram illustrating a method implemented with a device for managing a charging process in accordance with an exemplary embodiment of the present invention.

FIG. 4 shows a flow diagram illustrating a method implemented in a device for managing a charging process in accordance with an exemplary embodiment of the present invention. It should be appreciated that the method may be implemented with more or less steps, and the steps may be performed in an order different than that shown in FIG. 4. For example, two or more steps may be performed concurrently, and a step shown after another step may be performed before the "another step". Under the teaching of the present invention, such variations and modifications would become apparent for those skilled in the art.

Referring to FIG. 4, the method starts with a block 302. Then, the charging monitor 123 may check 304 a battery level of the rechargeable battery 121. If the battery level is less than or equal to 306 a minimum threshold, it indicates that the rechargeable battery 121 is at a very low battery level and battery charging needs to be maintained or initiated. Then, the method proceeds to block 312. Otherwise, the method proceeds to block 308. At the block 308, it is determined whether the battery level is greater than or equal to a maximum threshold, if yes, it indicates that the rechargeable battery 121 is at a very high battery level and it should not be charged any more to avoid overcharge. Then, the method proceeds to block 322. Otherwise, the method proceeds to block 312.

At the block 312, the charging monitor 123 may check whether the rechargeable battery 121 is being charged. If the rechargeable battery 121 is 314 being charged, the method returns back to the block 304; otherwise, it proceeds to block 318. At the block 318, the device 120 may establish a communication connection to the charging control device 100. As previously discussed, the communication connection may be a wireless communication connection, such as a Bluetooth channel established between the antenna 129 of the device 120 and the antenna 107 of the charging control device 100. In another embodiment, the communication connection may also be a wired communication connection.

Next, the method proceeds to block 320 where the signal generated by the charging controller 125 to turn on the power provided from the charger 110 to the device 120 may be passed via the communication connection to the charging control device 100. In response to the signal, the charging control device 100 may turn on the switch 103 so as to start charging the device 120. Then, after a delay 316 of a predetermined period of time, the method may check 312 again whether the rechargeable battery 121 is being charged.

Returning back to the block 308, if the battery level is higher than or equal to a maximum threshold, it indicates that battery charging should be stopped immediately to avoid overcharge. Then, at the block 322, the device 120 may establish a communication connection to the charging control device 100. The block 322 may be the same as the block 318, so its description in detail will be omitted here. Next, at the block 324, the signal generated by the charging controller 125 to turn off the power provided from the charger 110 to the device 120 may be passed via the communication connection to the charging control device 100. In response to the signal, the charging control device 100 may turn off the switch 103 so as to cut off the power to the device 120. Thus, overcharge may be prevented for the rechargeable battery 121. Next, the charging monitor 123 may check whether the rechargeable battery 121 is being charged. If it is determined at the block 328 that the rechargeable battery 121 is being charged, the method proceeds to the block 324 where the signal will be transmitted again. If the rechargeable battery 121 is not being charged, the method may return back to the block 304 after a delay 310 of a predetermined period of time.

As discussed above, the process of FIG. 4 may be implemented as software such as an app that may be distributed through internet. Customers may download the app through internet and install it in their devices such as cellular phones. The app may operate in conjunction with the charging control device 100 that may be implemented as a separate device (FIG. 2) or integrated in the charger (FIG. 3) so as to provide a safe charging process for the device 120.

Figure 3:
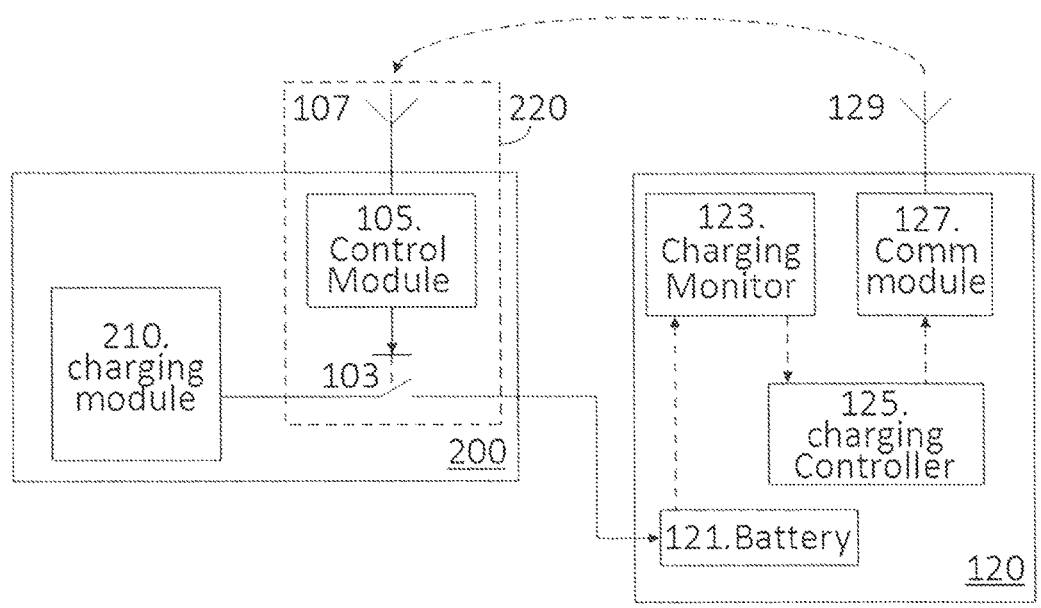
FIG. 3 is a block diagram showing another charging system in which an embodiment of the present invention may be implemented.

Now referring to FIG. 3, there is shown another charging system in which an embodiment of the present invention may be implemented. Please note that the same or similar components will be denoted by the same or similar numerals and the description thereof in detail will be omitted here.

As shown in FIG. 3, the charging system includes a charger 200 and the device 120. The device 120 has been described with reference to FIGS. 1, 2 and 4, so it will not be described in details here. The charger 200 includes a charging module 210 and a charging control module 220.

The charging module 210 may fulfill the functions of a conventional charger. Specifically, the charging module 210 may receive power from an external power supply such as a receptacle and convert the power to voltage/current that is acceptable for the device 120. The charging control module 220 may be connected in series between the charging module 210 and the device 120 to control the power provided from the charging module 210 to the device 120. Specifically, the charging control module 220 may include the switch 103, the control module 105 and the antenna 107. Since the switch 103, the control module 105 and the antenna 107 have been discussed in details with reference to FIGS. 1, 2 and 4, the description of which will be omitted here.

It should be appreciated that the charging system shown in FIG. 3 is similar to the charging system shown in FIG. 2 except that the charging control device 100 is integrated into the charger 110. Therefore, other aspects of the system in FIG. 3 are the same as, or similar to, those in FIG. 2, and will be not be described in details here.

Although embodiments set forth above are shown as being directed to conventional wired charging, it would be understood that the embodiments are also applicable for wireless charging. For example, the charging control device 100 may be integrated into a wireless charger to turn on/off the electromagnetic wave that carries power to the device 120.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A charging system comprising (1) a mobile device that includes a rechargeable battery and (2) an apparatus for controlling a charging process of the rechargeable battery, (1) the mobile device comprising
a monitor configured to monitor a charging status of the rechargeable battery;
a controller configured to generate, based on the charging status of the rechargeable battery, a wireless signal including a command to turn on/off power provided by a charger to the mobile device; and
a communication module configured to transmit the wireless signal through an antenna,
wherein the controller generates a wireless signal including a command to turn off the power provided by the charger to the mobile device when the monitor senses that the mobile device is being charged and a battery level of the rechargeable battery is higher than or equal to a maximum threshold;
wherein the controller generates a wireless signal including a command to turn on the power provided by the charger to the mobile device when the monitor senses that the mobile device is not being charged and a battery level of the rechargeable battery is lower than a maximum threshold;
(2) the apparatus comprising:
a first interface configured to be electrically connectable to the charger to receive power;
a second interface configured to be electrically connectable to the mobile device including the rechargeable battery to provide the power thereto;
a controlling circuit configured to generate a controlling instruction to turn on/off the power, wherein the controlling circuit includes an antenna configured to receive said wireless signal transmitted from the mobile device including said command to turn on/off the power, and wherein the controlling circuit is operable to generate the controlling instruction corresponding to the received command; and
a switch connected in series between the first interface and the second interface to turn on/off the power provided from the first interface to the second interface according to the controlling instruction.

2. The system according to claim 1, wherein the wireless signal is transmitted via a Bluetooth channel.

3. The system according to claim 1, wherein the monitor and the controller are implemented in a computer program in the mobile device, wherein the computer program comprises instructions for causing a processor to:
check battery level of the rechargeable battery;
check whether the rechargeable battery is being charged;
generate a signal to turn on/off power provided to the rechargeable battery according to the battery level and whether the rechargeable battery is being charged; and
transmit the signal to the apparatus.

4. The system according to claim 1, wherein the mobile device is an electric vehicle.

5. A charging system comprising (1) a mobile device that includes a rechargeable battery and (2) a charger for charging said mobile device, (1) the mobile device comprising:
a monitor configured to monitor a charging status of the rechargeable battery;
a controller configured to generate, based on the charging status of the rechargeable battery, a wireless signal including a command to turn on/off power provided by a charger to the mobile device; and
a communication module configured to transmit the wireless signal through an antenna;
wherein the controller generates a wireless signal including a command to turn off the power provided by the charger to the mobile device when the monitor senses that the mobile device is being charged and a battery level of the rechargeable battery is higher than or equal to a maximum threshold;

wherein the controller generates a wireless signal including a command to turn on, the power provided by the charger to the mobile device when the monitor senses that the mobile device is not being charged and a battery level of the rechargeable battery is lower than a maximum threshold;

(2) the charger comprising:

a charging module configured to provide power to the mobile device;

a controlling module configured to generate a controlling instruction to turn on/off the power, wherein the controlling module includes an antenna configured to receive the wireless signal transmitted from the mobile device including a command to turn on/off the power, and wherein the controlling module is operable to generate the controlling instruction corresponding to the received command; and a switch configured to be connectable in series between the charging, module and the mobile device to turn on/off the power provided from the charging module to the mobile device according to said controlling instruction.

\* \* \* \* \*